United States Patent [19]
Miller

[11] Patent Number: 5,949,216
[45] Date of Patent: Sep. 7, 1999

[54] DUAL MODE BATTERY CHARGERS FOR PORTABLE ELECTRONIC DEVICES AND RELATED METHODS

[75] Inventor: Brian David Miller, Durham, N.C.

[73] Assignee: Ericsson Inc., Research Triangle Park, N.C.

[21] Appl. No.: 08/919,717

[22] Filed: Aug. 27, 1997

[51] Int. Cl.[6] .................................................. H02J 7/00
[52] U.S. Cl. ........................................... 320/125; 320/140
[58] Field of Search .................................... 320/125, 160, 320/146, 148, DIG. 19, DIG. 21

[56] References Cited

U.S. PATENT DOCUMENTS 4,684,870  8/1987  George et al. ............................ 320/140
5,717,309  2/1998  Cho .......................................... 320/125

*Primary Examiner*—Peter S. Wong
*Assistant Examiner*—Lawrence Luk
*Attorney, Agent, or Firm*—Myers Bigel Sibley & Sajovec

[57] ABSTRACT

A dual mode battery charger includes an input that accepts a DC power signal, and a switch that switches the DC power signal from the input responsive to a control signal to generate a charging signal for the battery. A dual mode controller generates the control signal so that during a high current charging mode the switch is closed, and so that during a low current charging mode the switch is switched at a duty-cycle of less than 100 percent. In addition, a filter filters the charging signal to reduce a ripple portion thereof. Related methods and electronic devices are also discussed.

39 Claims, 3 Drawing Sheets

DUAL MODE BATTERY CHARGERS FOR PORTABLE ELECTRONIC DEVICES AND RELATED METHODS

FIELD OF THE INVENTION

The present invention relates to the field of electronics and more particularly to battery chargers.

BACKGROUND OF THE INVENTION

The use of portable electronic devices has increased dramatically in recent years. For example, portable electronic devices such as notebook computers, cellular telephones, and Walkman™ type radios and tape and compact disk players are in common use. In addition, portable electronic devices such as data phones and personal digital assistants (PDAs) which combine communications and computing capabilities are being developed and sold. The use of small, light weight rechargeable batteries to power these portable electronic devices is also increasing. Accordingly, there exists a need for low-cost, small, light weight battery rechargers to recharge these batteries quickly and efficiently.

In the past, single rate battery chargers have been used. For example, a current limited DC source can be shorted to the battery pack. A single rate charger, however, may be unable to provide 100% charging. In particular, many batteries may need a fast-rate charge followed by a low-rate charge to reach a fully charged state. For example, a fast-rate charge may be followed by a C/10 (one tenth the current of the fast-rate charge) time-limited charge to insure 100% charging of a battery under all conditions. This fast- and low-rate charging may be particularly desirable when charging medium and large sized battery packs such as those used to power notebook computers, personal digital assistants, and data phones. The use of fast- and low-rate charging may also be desired when simultaneously charging the battery and operating the portable electronic device. In addition, variable rate charging may be beneficial when used with batteries having particular chemistries such as nickel based and lithium based batteries.

Accordingly, switch-mode battery chargers have been used to provide fast- and low-rate charging. In a switch-mode battery charger, a switch and a filter are arranged in series between a DC source and the battery to be charged. The rate of charge is determined by a duty-cycle at which the switch is turned on and off. A higher duty-cycle provides a faster-rate charge, and a lower duty-cycle provides a lower-rate charge. To reduce the AC ripple of the charging signal provided to the battery, the filter typically includes an inductor in series between the switch and the battery, and a free-wheeling diode between the switch output and ground.

To allow switching over the full range of charging rates, a relatively large inductor is generally used. In particular, a conventional battery charger uses an inductor which does not saturate over the full range of charging rates. The use of a large inductor may increase the size, weight, and cost of the charger. In addition, energy stored in the inductor may result in undesirable transients when switched at higher charging rates. The switching transistor and free-wheeling diode should also be sized to accommodate the high peak current due to the energy stored in the inductor during fast-rate charging.

Another approach has been to use dissipative elements to vary the charge rate. For example, a passive component such as a resistor can be used to control the current to the battery. Alternately, an active component, such as a transistor operating in a linear mode, can be used to control the charging current to the battery. When using medium and large sized battery packs, however, the power dissipated in the dissipative element may be excessive. Accordingly, a dissipative charger may draw excessive power, generate excessive heat, and have reduced reliability. To compensate for the heat and power, a relatively large dissipative element may be required.

According to yet another approach, a fast-rate charge can be provided by shorting a current limited DC supply to the battery, and then a low rate charge can be provided by using a dissipative element. Such an approach suffers the shortcomings discussed above with regard to the dissipative element as well as the increased complexity of combining the two approaches.

Notwithstanding the battery chargers discussed above, there continues to exist a need in the art for improved battery chargers. In particular, there exists a need in the art for small, low-cost, and light weight battery chargers which can be included in a portable electronic device.

SUMMARY OF THE INVENTION

It is therefor an object of the present invention to provide improved battery chargers and battery charging methods.

It is another object of the present invention to provide battery chargers which can have reduced size and weight.

It is still another object of the present invention to provide lower cost battery chargers and methods.

These and other objects are provided according to the present invention by first charging a battery with a relatively high charging current and then charging the battery with a relatively low charging current. In particular, a switch is connected between a DC supply and the battery, and the switch is turned on to generate the high charging current effectively shorting the DC supply to the battery. The switch is then turned on and off at a duty-cycle of less than 100% to generate the low charging current. Moreover, the DC supply can be a current limited DC supply.

Because there is no high frequency switching at the high charging current, electrical noise and transients are reduced, and the need to filter the charging current during high current charging is also reduced. Accordingly, an inductor used to filter noise during low current charging can be in saturation during high current charging. The energy stored in the inductor during high current charging can be reduced if the inductor is in saturation thus allowing the use of a smaller free-wheeling diode. During high current charging, switching losses are reduced in the switching transistor thus allowing the use of a smaller transistor.

In particular, a dual mode battery charger according to the present invention includes an input that accepts a DC power signal, and a switch that switches the DC power signal from the input responsive to a control signal to generate a charging signal for the battery. A dual mode controller generates the control signal so that during a high current charging mode the switch is closed, and so that during a low current charging mode the switch is switched at a duty-cycle of less than 100 percent. In addition, a filter filters the charging signal to reduce a ripple portion thereof.

In particular, the filter can include an inductor between the switch and the battery and a free-wheeling diode between the switch and ground. Preferably, the inductor is saturated during the high current charging mode when the switch is closed. Accordingly, the effective inductance of the inductor is reduced reducing transients when the high current charging mode begins and ends, and allowing the use of a smaller switch and free-wheeling diode. In particular, the charging signal can be approximately 1.5 Amps during the high current charging mode, and the charging signal can be approximately 150 milliAmps during the low current charging mode.

The battery charger can also include a sensor that measures an output of the switch and generates a sensor signal responsive to the output, wherein the dual mode controller varies the duty-cycle during the low current charging mode in accordance with the sensor signal. In particular, the sensor can be an ammeter. Alternately or additionally, the battery charger can include a sensor that measures an output of the switch and generates a sensor signal responsive to the output during the high current charging mode, wherein the dual mode controller switches to the low current charging mode when the sensor signal exceeds a predetermined value. Here, the sensor can be a volt meter.

In addition, the battery can be included in a portable electronic device such as a data phone. According to this aspect of the invention, the portable electronic device includes a housing and a receptacle in the housing for receiving the battery used to provide electrical power for the electronic device. A battery charger in the housing charges the battery. This battery charger includes an input that accepts a DC power signal, and a switch that switches the DC power signal from the input responsive to a control signal to generate a charging signal for the battery. A dual mode controller generates the control signal so that during a high current charging mode the switch is closed, and so that during a low current charging mode the switch is turned on and off at a duty-cycle of less than 100 percent. The battery charger may also include a filter that filters the charging signal to reduce a ripple portion thereof.

The battery charger of the present invention can thus provide high and low current charging while using components having reduced size, weight, and cost. Accordingly, the cost of an electronic device including the battery charger can also be reduced.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many portable battery powered electronic devices are now available. For example, battery powered notebook computers; cellular telephones; Walkman™ type radios and tape and compact disk players; data phones; and personal digital assistants (PDAs) can be used at locations where conventional electrical power is not available. For convenience, many of these devices use rechargeable batteries and include a battery charger on board. Accordingly, the device can be plugged into a wall outlet for charging without removing the battery. In addition, the battery can be charged while simultaneously operating the device.

Figure 1:
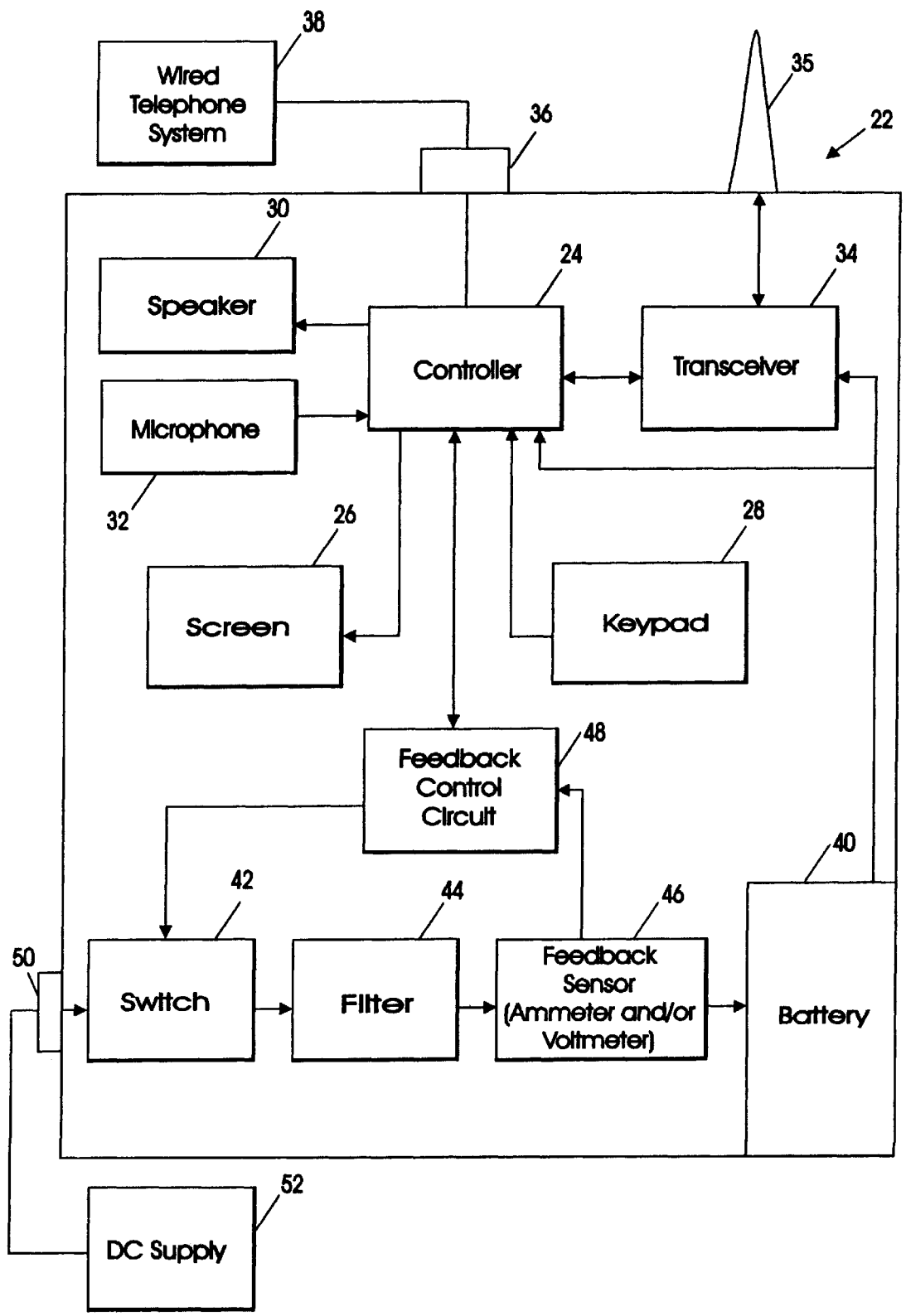
FIG. 1 is a block diagram illustrating a portable electronic device including a battery charger according to the present invention.

A data phone including a battery charger according to the present invention is illustrated in FIG. 1. As shown, the data phone 22 includes a controller 24, a screen 26, and a keypad 28. The data phone can also include a speaker 30, a microphone 32, a transceiver 34, and an antenna 35. The data phone can thus provide computing and communications capabilities. For example, the data phone can provide word processing, internet access, and organizer functions, as well as voice communications. The data phone can also include an interface 36 for connection to a wired telephone system 38. The interface 36 can be in addition to or in place of the transceiver 34 and antenna 35.

The battery 40 provides electrical power for operation of the data phone 22 when other sources are not available. The battery can be permanently installed in the data phone, or the battery can be removable for replacement or for recharging externally. As shown, the data phone 22 also includes a battery charger for charging the battery while installed. In addition, the battery charger allows the battery to be charged while operating the data phone from an external source.

The battery charger includes a switch 42, a filter 44, a feedback sensor 46, and a feedback control circuit 48. The feedback sensor can include an ammeter and/or a voltmeter. In addition, an interface 50 provides an electrical connection to an external DC supply 52. The DC supply can be in a housing separate from the data phone, and can be temporarily connected to the data phone by a flexible wire at the interface 50. The DC supply 52 preferably provides a constant voltage output up to a predetermined output current beyond which the voltage drops quickly. In one embodiment, the battery can be a 7.2 volt nickel-cadmium battery, and the DC supply can provide a 12 volt output with a current up to 1.5 Amps.

The DC supply 52 can be an AC adapter which is plugged into a conventional AC wall outlet. Accordingly, the DC supply converts the AC signal into the desired DC signal. Alternately, the DC supply can be a cigarette lighter adapter which plugs into an automobile cigarette lighter. In this embodiment, the DC supply converts the DC signal available at the cigarette lighter into the desired DC signal.

Figure 2:
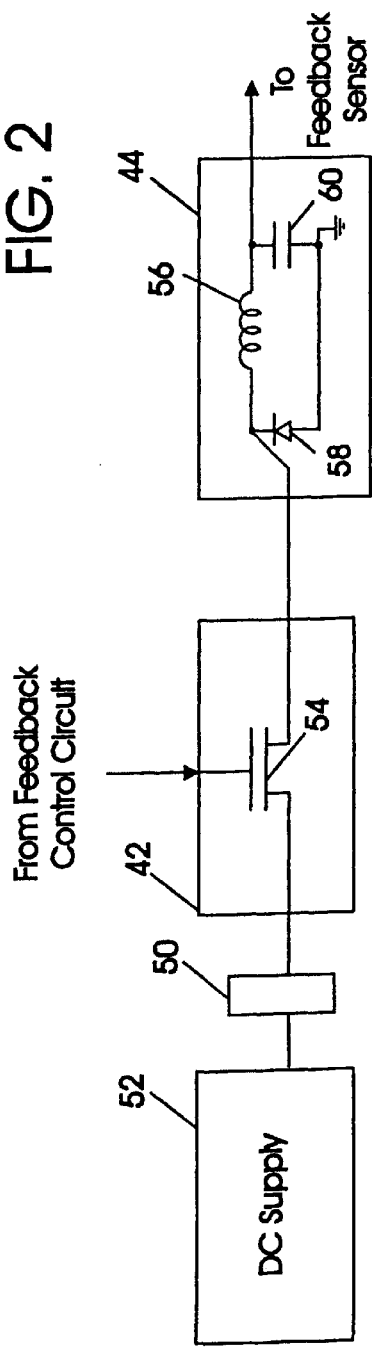
FIG. 2 is a schematic diagram illustrating the switch and filter of FIG. 1.

A schematic diagram of the switch 42 and the filter 44 is shown in FIG. 2. As shown, the switch 42 preferably includes a switching transistor 54 such as a MOSFET that turns on and off responsive to control signals generated by the feedback control circuit 48. The filter 44 includes an inductor 56 and a free-wheeling diode 58. An optional capacitor 60 can also be included. As an example, the inductor 56 can have an inductance of 10 $\mu H$, and the capacitor 60 can have a capacitance of 0.1 $\mu F$. Alternately, the capacitor 60 can be omitted as the battery may provide sufficient capacitance internally. Accordingly, the filter reduces AC ripple from the output of the switch 42.

The operation of the battery charger will now be discussed with reference to FIGS. 1 and 2. The feedback sensor 46 can measure the charging current generated by the switch 42 and filter 44, and this measurement can be provided to the feedback control circuit 48. The feedback control circuit 48 generates the switch control signals responsive to the feedback measurement. There may also be a transfer of data and commands between the feedback control circuit 48 and the controller 24.

The feedback control circuit generates control signals that turn the switch 54 on and off at a desired frequency and duty-cycle. Accordingly, the charging current can be increased by increasing the duty-cycle, and the charging current can be decreased by decreasing the duty-cycle. The noises resulting from the switching can be reduced by the filter 44.

As will be understood by those having skill in the art, the feedback control circuit can be implemented, for example, as a custom integrated circuit, discrete analog circuits, or a microprocessor. Alternately, the feedback control circuit can be implemented within the controller 24, or control of the switch can be shared between the feedback control circuit 48 and the controller 24. In addition, information can be shared between the feedback control circuit 48 and the controller 24.

The control signals are provided to the switch 54 so that the battery charger provides a charging current in either a high current charging mode or a low current charging mode. In the high current charging mode, the switch 54 is closed. In other words, the switch is turned on with a 100% duty-cycle. In the low current charging mode, the switch is turned on and off at a duty-cycle of less than 100%. In particular, the battery may be first charged using the high current charging mode, and the charge is completed using the low current charging mode.

As the switch is closed during the high current charging mode, the switch 54 and the inductor 56 act as electrical shorts. Accordingly, the charging current is determined by the current limit of the DC supply 52. As discussed above, if the DC supply can provide current up to 1.5 Amps, the charging current can be 1.5 Amps during the high current charging mode. Furthermore, there is a reduction in the electrical noise generated during the high current charging mode because there is no continuous switching.

A lower charging current is provided during the low current charging mode by turning the switch 54 on and off at a duty-cycle of less than 100%. In particular, a duty-cycle can be chosen so that the charging current is one tenth of the current provided during the high current charging mode. For example, the charging current can be approximately 150 milliAmps during the low current charging mode. The AC ripple of the charging current caused by the switching can be reduced by the filter 44. The desired current can be maintained by using the feedback sensor 46 to measure the current, and to provide the current measurement to the feedback control circuit 48. The duty-cycle of the control signal can thus be increased or decreased to maintain the desired current.

Figure 3A:
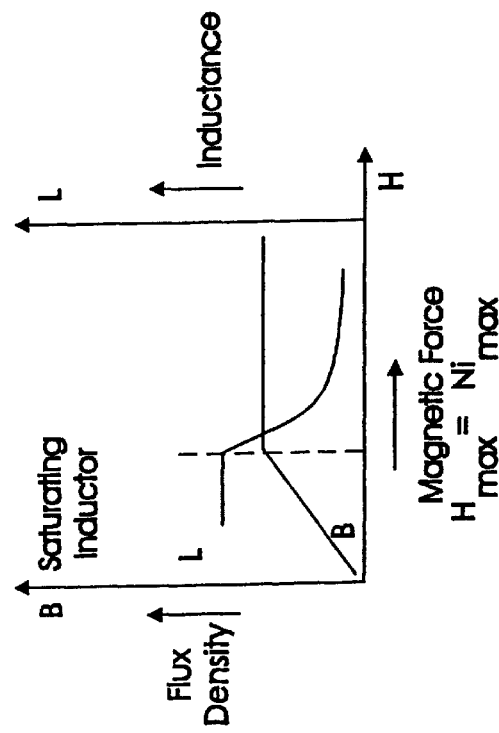
FIG. 3A is a graph illustrating the flux density of an ideal inductor as a function of magnetizing force.

Because the DC supply is not switched during the high current charging mode, the inductor 56 is not required to smooth out AC ripple. Accordingly, the inductor 56 can be saturated during the high current charging mode without significantly reducing the performance of the battery charger. As shown in FIG. 3A, the flux density B of an ideal inductor increases indefinitely as the magnetizing force H increases wherein the magnetizing force H is directly proportional to the number of turns N in the inductor winding and the current i through the inductor. In addition, the inductance L of an ideal inductor remains constant with increasing current i and magnetizing force H.

Figure 3B:
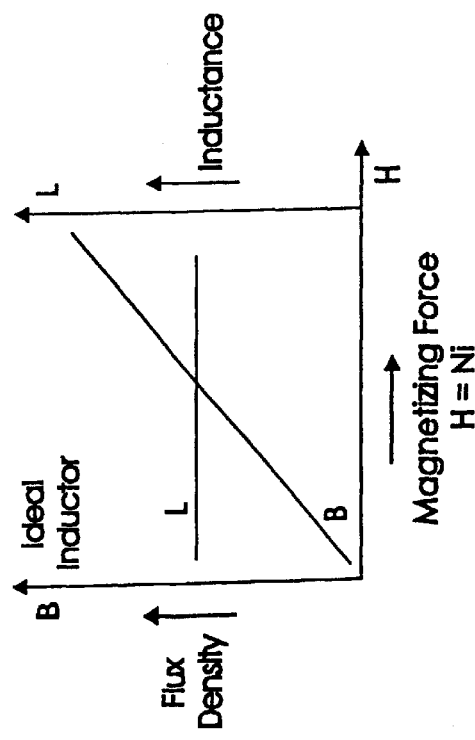
FIG. 3B is a graph illustrating the flux density for an actual inductor as a function of magnetizing force.

As shown in FIG. 3B, however, the increase in flux density B of an actual inductor is reduced when the magnetic force H exceeds a predetermined value $H_{max}$ for that capacitor. In other words, an actual inductor becomes saturated when the current through the inductor exceeds a predetermined current $i_{max}$ for that inductor that results in the predetermined magnetic force $H_{max}$. Accordingly, when the current through an actual inductor exceeds $i_{max}$, the inductor becomes saturated and the inductance L begins to drop. The vertical dashed line indicates the region beyond which the inductor is in saturation.

To maintain constant inductance at higher currents, larger more costly inductors are generally required. In particular, a constant inductance can be maintained at a higher current by increasing the magnetic core mass for the inductor thus increasing the size, weight, and cost of the inductor. Conventional battery chargers including switching circuits have generally been designed to accommodate a full range of potential charging currents. Accordingly, these battery chargers have included a filter inductor which maintains a constant inductance over the full range of potential charging currents.

To the best of the Applicant's knowledge, however, the Applicant is the first to realize that since many rechargeable batteries can be recharged using a first high current charging mode followed by a second low current charging mode, therefor a relatively small and inexpensive inductor can thus be used in the filter. In particular, the Applicant realized that by closing the switch (100% duty-cycle) during the high current charging mode, the inductor could be allowed to saturate during the high current charging mode. Accordingly, the charging current is determined by the output characteristics of the DC supply 52, and these output characteristics can be designed to provide the desired current during the high current charging mode.

A lower charging current is provided during the low current charging mode by turning the switch 54 on and off at a desired frequency and duty-cycle. A relatively small inductor can thus provide the required inductance for switching during the low current charging mode. In particular, a smaller magnetic core mass can be used thus also reducing the diameter of each turn allowing a reduction in the length of wire used. Accordingly, the size, weight, and cost of the battery charger can thus be reduced for the battery charger and the data phone or other electronic device including the battery charger.

Furthermore, performance advantages can be obtained by using an inductor that saturates during high current charging. First, noise is reduced because there is no high frequency switching during high current charging. Second, the transients that result when the switch is turned off at the end of high current charging are reduced because the saturated inductor will not store as much energy as an unsaturated inductor. Third, a smaller switch transistor and a smaller free-wheeling diode can be used because high frequency switching is reduced during high current charging and because of the reduced transients. According to a preferred embodiment of the present invention, the battery charger is designed so that the inductor is in saturation during the high current charging mode and so that the inductor is not in saturation during the low current charging mode. In other words, the inductor preferably has a relatively high effective inductance during the low current charging mode and a relative low effective inductance during the high current charging mode.

As an example, when charging nickel based batteries, such as NiCd and NiMH batteries, a high current charge can be followed by a C/10 charge for a predetermined period of time wherein the C/10 charge provides a switched charging current that is one tenth that of the high current charge. The DC supply can thus provide a 1.5 Amp charging current during high current charging, followed by a 150 milliAmp charging current during low current C/10 charging. The DC supply thus operates as a constant current supply during unswitched high current charging and as a constant voltage supply during switched low current charging. The feedback sensor 46 can be used to provide a current measurement to the feedback control circuit 48 wherein the current measurement is used to determine when to switch from high current charging to low current charging. The current measurement can also be used to maintain the desired switching duty-cycle during low current charging.

When charging Lithium based batteries, it may be desirable for the feedback sensor to provide both current and voltage measurements to the feedback control circuit 48. Accordingly, the transition from high current charging to low current charging can be based on both current and voltage considerations.

Figure 4:
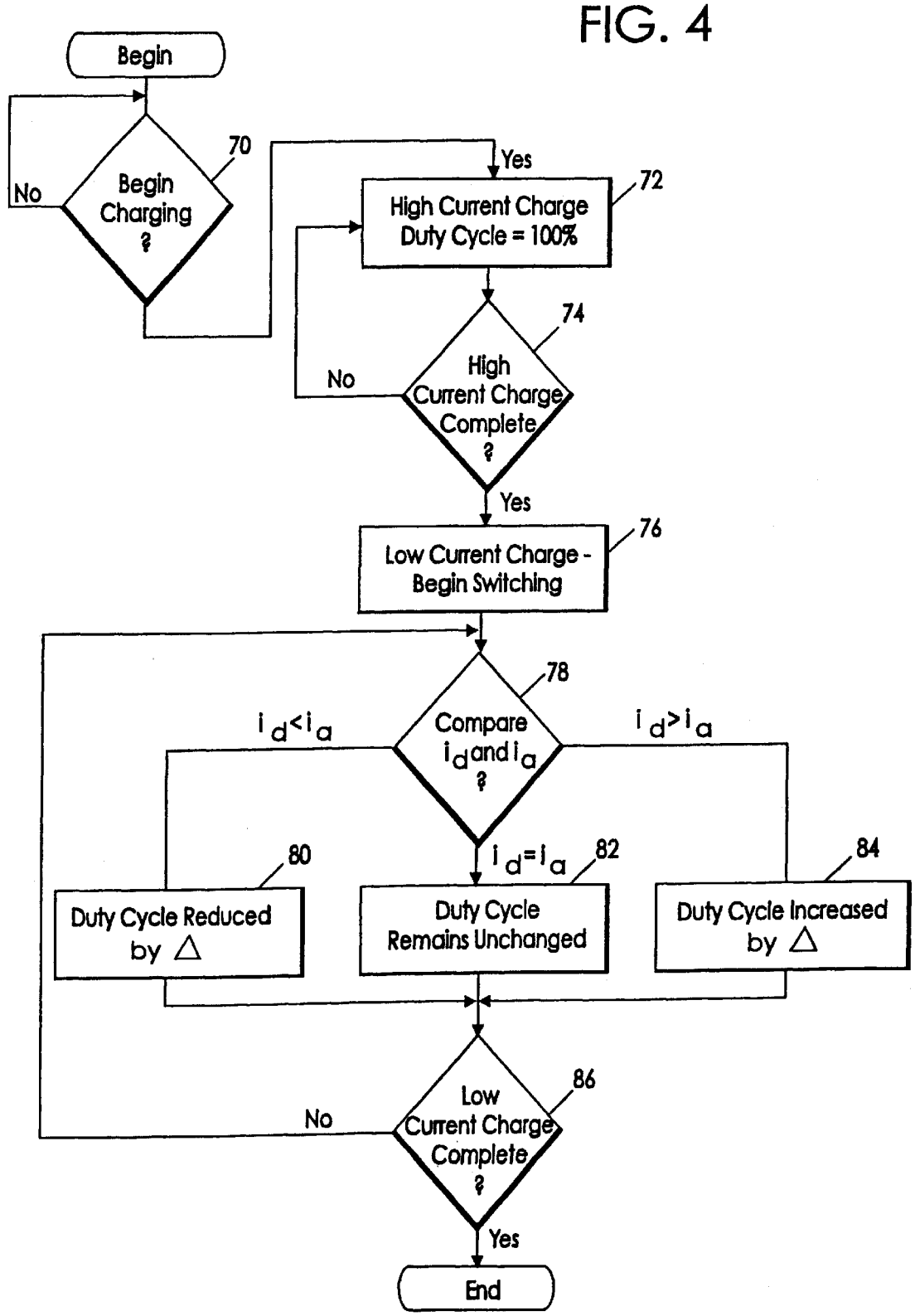
FIG. 4 is flow chart illustrating steps of a method for operating the battery charger of FIG. 1.

Steps for operating the battery charger of the present invention are illustrated in FIG. 4. As discussed above, these steps can be carried out by the feedback control circuit 48 and/or the controller 24. The decision is made at block 70 to initiate charging operations. For example, charging operations may be initiated after determining that a DC supply 52 is connected at interface 50 and that the battery 40 is not fully charged.

After beginning charging operations, a high current charge mode is entered at block 72 wherein the switch 54 is closed. The switch remains closed until a determination is made at block 74 that the high current charge is complete. The determination that the high current charge is complete can be made by timing the high current charge or by measuring the charging signal current and/or voltage into the battery using the feedback sensor 46, or by other means, such as battery temperature measurements.

Upon completing the high current charge, a low current charge mode is entered at block 76 wherein the switch is turned on and off at a predetermined frequency and duty-cycle to reduce the charging current. The actual charging current $i_a$ is then compared to the desired charging current $i_d$ at block 78. If the actual charging current is less than the desired charging current, the duty-cycle of switching is increased by an amount delta ($\Delta$) proportional to the difference between the two current values at block 84. If the actual charging current is greater than the desired charging current, the duty-cycle of switching is reduced by the amount delta ($\Delta$) at block 80. If the actual charging current is equal to the desired charging current, the duty-cycle is not changed at block 82. In particular, delta ($\Delta$) can be determined using the formula:

$$K_1(i_d - i_a),$$

where $K_1$ is a predetermined constant.

The low current charge is maintained until a determination is made at block 86 that the low current charge is complete. The determination that the low current charge is complete can be made by timing the low current charge or by measuring the charging signal current and/or voltage into the battery using the feedback sensor 46.

As discussed above, the battery charger according to the present invention can be provided as a part of a portable electronic device. Accordingly, the battery can be charged without removing it from the device. In addition, the battery can be charged while operating the electronic device.

Alternately, the battery charger of the present invention can be provided as a stand alone unit. A discharged battery can thus be removed from an electronic device and charged in the stand alone battery charger.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A dual mode battery charger for charging a battery, said charger comprising:

an input that accepts a DC power signal;

a switch that switches the DC power signal from said input responsive to a control signal to generate a charging signal for the battery; and a dual mode controller that generates said control signal, so that during a high current charging mode said switch is maintained closed to provide a high current charging signal to the battery, and so that during a low current charging mode said switch is switched at a duty-cycle of less than 100 percent to provide a low current charging signal less than said high current charging signal.

2. A dual mode battery charger according to claim 1, further comprising:

a filter that filters said charging signal to reduce a ripple portion thereof.

3. A dual mode battery charger according to claim 2 wherein said filter comprises an inductor between said switch and the battery and a free-wheeling diode between said switch and ground.

4. A dual mode battery charger according to claim 3 wherein said inductor is saturated during said high current charging mode when said switch is maintained closed, and wherein said inductor is not saturated during said low current charging mode when said switch is switched at said duty-cycle of less than 100 percent.

5. A dual mode battery charger according to claim 1 wherein said charging signal is approximately 1.5 amps during said high current charging mode and said charging signal is approximately 150 milliamps during said low current charging mode.

6. A dual mode battery charger according to claim 1 further comprising:

a sensor that measures an output of said switch and generates a sensor signal responsive to said output, wherein said dual mode controller varies said duty-cycle during said low current charging mode in accordance with said sensor signal.

7. A dual mode battery charger according to claim 6 wherein said sensor comprises an ammeter.

8. A dual mode battery charger according to claim 1 further comprising:

a sensor that measures an output of said switch and generates a sensor signal responsive to said output during said high current charging mode, wherein said dual mode controller switches to said low current charging mode when said sensor signal exceeds a predetermined value.

9. A dual mode battery charger according to claim 8 wherein said sensor comprises a volt meter.

10. A dual mode battery charger according to claim 1 wherein the DC power signal is provided by a current limited source.

11. A method for charging a battery, said method comprising the steps of:

switching a DC power signal responsive to a control signal to generate a charging signal for the battery; and generating said control signal, so that during a high current charging mode said DC power signal is maintained on with a duty-cycle of 100 percent to provide a high current charging signal to the battery, and so that during a low current charging mode said DC power signal is switched at a duty-cycle of less than 100 percent to provide a low current charging signal less than said high current charging signal.

12. A method according to claim 11 further comprising the step of:

filtering said charging signal to reduce a ripple portion thereof.

13. A method according to claim 12 wherein said filtering step comprises providing an inductor between said charging signal and the battery and providing a free-wheeling diode between said charging signal and ground.

14. A method according to claim 13 wherein said inductor is saturated during said high current charging mode when said DC power signal is maintained on with said duty-cycle of 100 percent, and wherein said inductor is not saturated during said low current charging mode when said DC power is switched at said duty-cycle of less than 100 percent.

15. A method according to claim 11 wherein said charging signal is approximately 1.5 amps during said high current charging mode and said charging signal is approximately 150 milliamps during said low current charging mode.

16. A method according to claim 11 further comprising the steps of:

sensing said charging signal; and generating a sensor signal responsive to said charging signal, wherein said duty-cycle is varied during said low current charging mode in accordance with said sensor signal.

17. A method according to claim 16 wherein sensor signal comprises a measure of said charging signal current.

18. A method according to claim 11 further comprising the steps of:

measuring said charging signal;

generating a sensor signal responsive to said charging signal during said high current charging mode; and switching to said low current charging mode when said sensor signal exceeds a predetermined value.

19. A method according to claim 18 wherein said sensor signal comprises a measure of said charging signal voltage.

20. A method according to claim 11 wherein the DC power signal is provided by a current limited source.

21. A battery powered portable electronic device comprising:

a housing;

a receptacle in said housing for receiving the battery used to provide electrical power for the electronic device;

a battery charger in said housing that charges the battery, said battery charger comprising, an input that accepts a DC power signal, a switch that switches the DC power signal from said input responsive to a control signal to generate a charging signal for the battery, and a dual mode controller that generates said control signal, so that during a high current charging mode said switch is maintained closed to provide a high current charging signal to the battery, and so that during a low current charging mode said switch is switched at a duty-cycle of less than 100 percent to provide a low current charging signal less than said high current charging signal.

22. An electronic device according to claim 21 wherein said battery charger further comprises a filter that filters said charging signal to reduce a ripple portion thereof.

23. An electronic device according to claim 22 wherein said filter comprises an inductor between said switch and the battery and a free-wheeling diode between said switch and ground.

24. An electronic device according to claim 23 wherein said inductor is saturated during said high current charging mode when said switch is maintained closed, and wherein said inductor is not saturated during said low current charging mode when said switch is switched at said duty-cycle of less than 100 percent.

25. An electronic device according to claim 21 wherein said charging signal is approximately 1.5 amps during said high current charging mode and said charging signal is approximately 150 milliamps during said low current charging mode.

26. An electronic device according to claim 21 further comprising:

a sensor that measures an output of said switch and generates a sensor signal responsive to said output, wherein said dual mode controller varies said duty-cycle during said low current charging mode in accordance with said sensor signal.

27. An electronic device according to claim 26 wherein said sensor comprises an ammeter.

28. An electronic device according to claim 21 further comprising:

a sensor that measures an output of said switch and generates a sensor signal responsive to said output during said high current charging mode, wherein said dual mode controller switches to said low current charging mode when said sensor signal exceeds a predetermined value.

29. An electronic device according to claim 28 wherein said sensor comprises a volt meter.

30. An electronic device according to claim 21 wherein said input accepts the DC power signal from outside said housing.

31. An electronic device according to claim 21 further comprising:

a video screen visible from outside said housing;

a keyboard accessible from outside said housing; and a processor inside said housing that generates video information on said video screen based on input from said keyboard using electrical power provided by the battery.

32. An electronic device according to claim 21 further comprising:

a microphone on said housing that generates electronic input signals in response to sound pressure waves;

a speaker on said housing that generates sound pressure waves in response to electronic output signals; and a transceiver in said housing for transmitting and receiving said electronic input and output signals using electrical power provided by the battery.

33. An electronic device according to claim 21 wherein the DC power signal is provided by a current limited source.

34. A dual mode battery charger according to claim 1 wherein said switch and said dual mode controller first provide said high current charging signal to the battery and then provide said low current charging signal to the battery during a single charging operation for the battery.

35. A method according to claim 11 wherein said high current charging mode is followed by said low current charging mode during a single charging operation for the battery.

36. A battery powered electronic device according to claim 21 wherein said switch and said dual mode controller first provide said high current charging signal to the battery and then provide said low current charging signal to the battery during a single charging operation for the battery.

37. A dual mode battery charger according to claim 1 further comprising:
   a filter that filters said charging signal to reduce a ripple portion thereof wherein said filter comprises an inductor between said switch and the battery and a free-wheeling diode and wherein said inductor is saturated during said high current charging mode when said switch is maintained closed, and wherein said inductor is not saturated during said low current charging mode when said switch is switched at said duty-cycle of less than 100 percent.

38. A method according to claim 11 further comprising the step of:
   filtering said charging signal to reduce a ripple portion thereof wherein said filtering step comprises providing an inductor between said charging signal and the battery and providing a free-wheeling diode wherein said inductor is saturated during said high current charging mode when said DC power signal is maintained on with said duty-cycle of 100 percent, and wherein said inductor is not saturated during said low current charging mode when said DC power is switched at said duty-cycle of less than 100 percent.

39. A battery powered electronic device according to claim 21 wherein said battery charger further comprises:
   a filter that filters said charging signal to reduce a ripple portion thereof wherein said filter comprises an inductor between said switch and the battery and a free-wheeling diode wherein said inductor is saturated during said high current charging mode when said switch is maintained closed, and wherein said inductor is not saturated during said low current charging mode when said switch is switched at said duty-cycle of less than 100 percent.

* * * * *